May 17, 1927.  
C. J. RABIDOUX ET AL  
1,629,411  
RIM  
Filed Nov. 5, 1926  
2 Sheets-Sheet 1
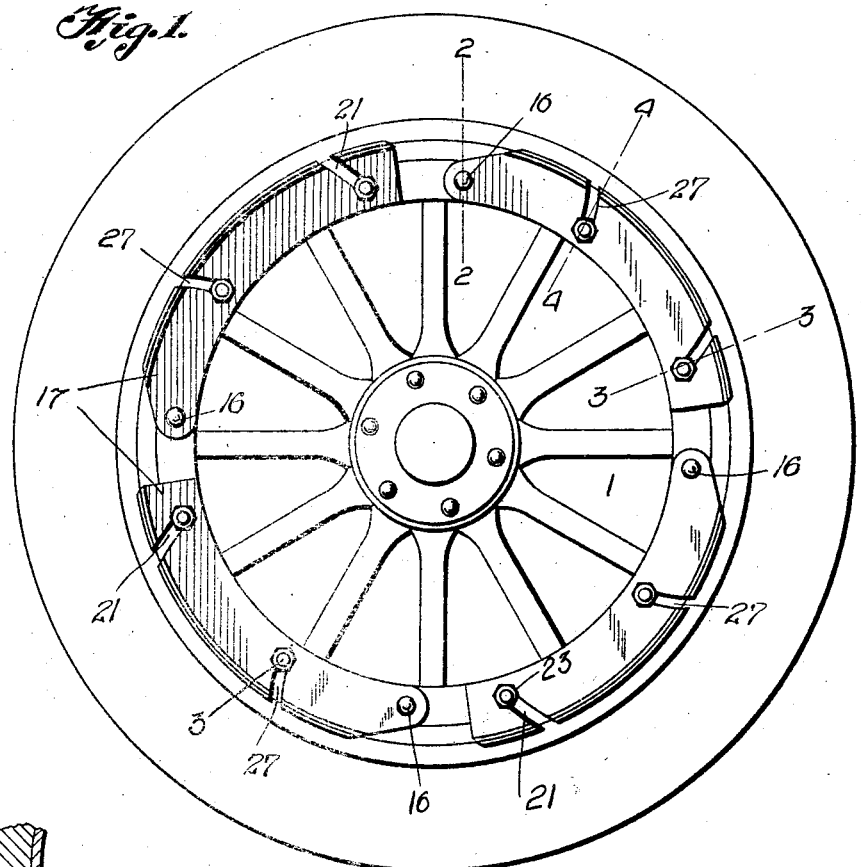
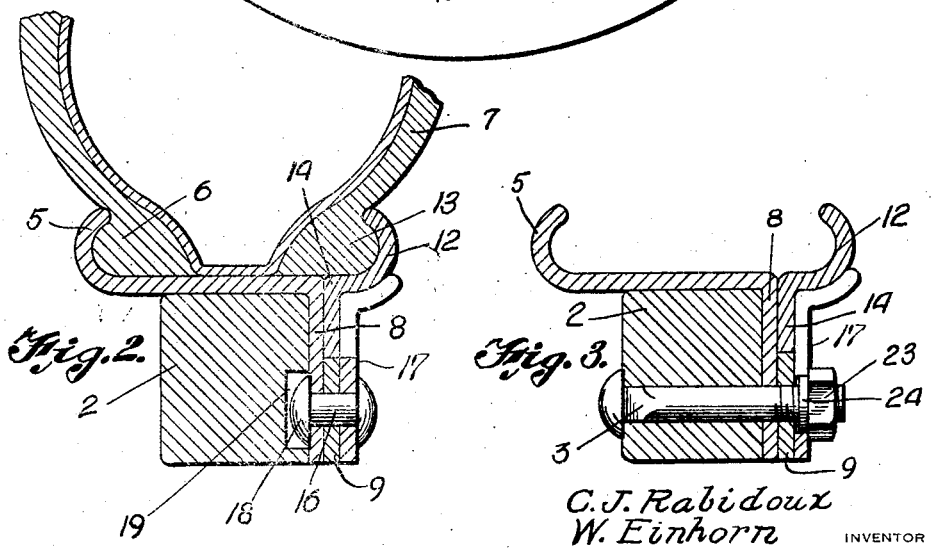
C. J. Rabidoux  
W. Einhorn INVENTOR  
BY Victor J. Evans  
ATTORNEY May 17, 1927.  1,629,411
C. J. RABIDOUX ET AL
RIM
Filed Nov. 5, 1926  2 Sheets-Sheet 2
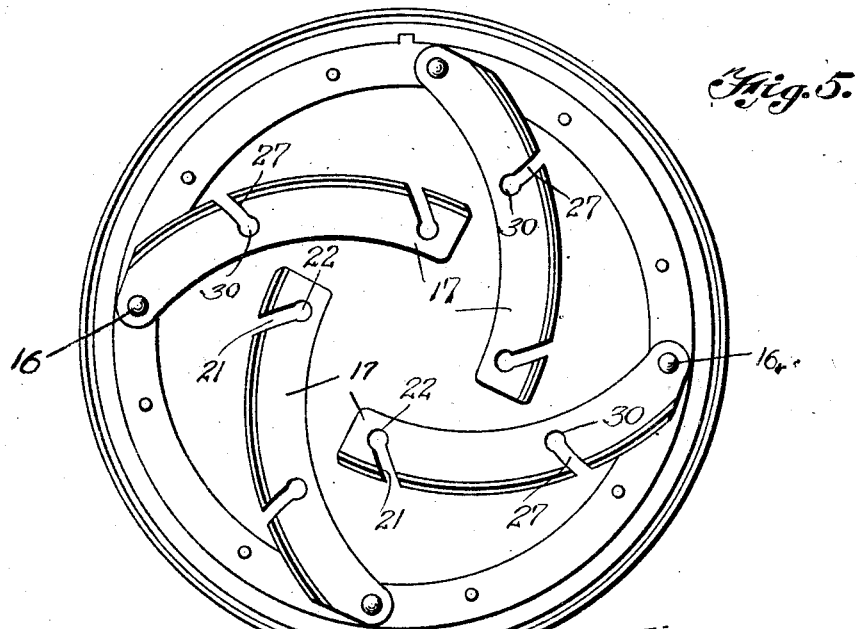
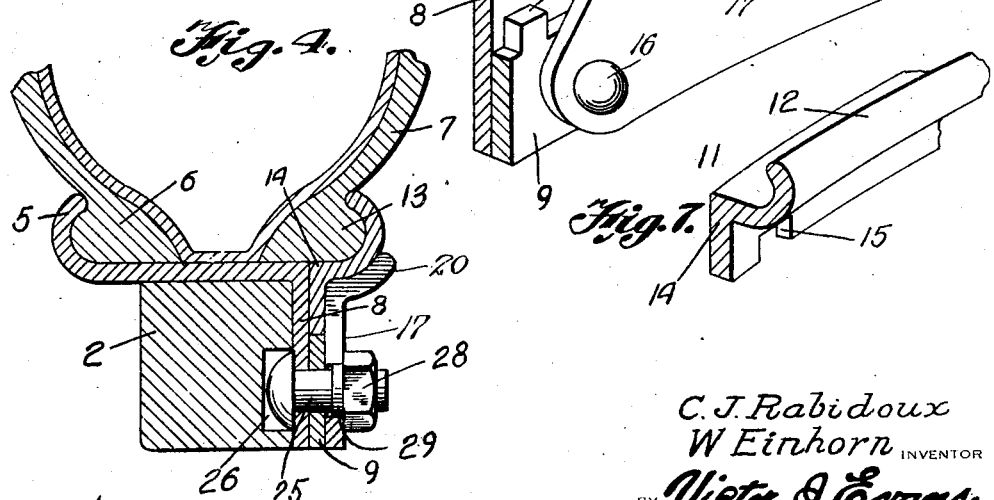
C. J. Rabidoux
W Einhorn INVENTOR
BY Victor J. Evans
ATTORNEY Patented May 17, 1927.

1,629,411

UNITED STATES PATENT OFFICE.

CHARLES JOSEPH RABIDOUX AND WILLIAM M. EINHORN, OF BLUE ISLAND, ILLINOIS.

RIM.

Application filed November 5, 1926. Serial No. 146,450.

Our present invention has reference to a tire carrying means for automobile or like vehicle wheels, and our primary object is the provision of a device of this character which may be easily, quickly and securely locked on the felly or rim of a wheel, and which comprises sections that are readily separated when the locking means is released to permit of a quick removal of a tire from the rim or a quick arrangement of a tire on said rim.

A further object is the provision in a device for this purpose of a tire carrying rim comprising a comparatively wide or main section and a comparatively narrow or auxiliary section, means being provided for preventing the circumferential movement of the sections with respect to each other and with respect to the wheel, and swingable means being also provided for contacting engagement with the auxiliary section for holding the same associated with the main section and locking both of said sections.

To the attainment of the above broadly stated objects and others which will present themselves as the nature of the invention is better understood, the improvement further resides in certain other novel details of construction, combination and operative association of parts, one satisfactory embodiment of which is disclosed by the accompanying drawings.

In the drawings:

Figure 1 is a side elevation of our improvement in applied position.

Figure 2 is a detail sectional view approximately on the line 2—2 of Figure 1.

Figure 3 is a detail sectional view on the line 3—3 of Figure 1.

Figure 4 is a detail sectional view approximately on the line 4—4 of Figure 1.

Figure 5 is a side elevation of the improvement showing the swingable members or levers swung to permit of the separation of the rim members.

Figure 6 is a fragmentary perspective view of a portion of the main rim member or section and the elements associated therewith.

Figure 7 is a similar view of the auxiliary rim section.

Referring now to the drawings in detail, the numeral 1 designates an ordinary vehicle wheel and 2 the rim or felly thereof. At determined spaced intervals we pass transversely through the rim or felly 2 bolt members 3. In the showing of the drawings only four of such bolts are employed.

Our improvement contemplates the employment of a comparatively wide tire carrying rim section 4. This section is, of course, designed to be arranged around the wheel rim or felly 2 and the outer edge of the said section 4 is formed with a continuous inwardly rounded lip 5 to receive therein one of the beads 6 on the tire 7. The opposite or inner edge of the section 4 is integrally formed with a right angular flange 8, and this flange contacts with one of the sides of the wheel rim or felly 2, and receives therethrough the bolts 3. The flange 8 may have its outer face, from its outer edge thickened, but preferably there is arranged against the said portion of the flange 8 a flat ring member 9. This ring also receives the bolts 3 therethrough, and the ring has its upper edge or periphery formed with an upstanding lug 10.

The removable or auxiliary section of the rim is indicated by the numeral 11. The section 11 has its outer edge formed with a continuous rounded inwardly directed lip 12 to engage with the second bead 13 of the tire 7. The inner edge of the section 11 is formed with a flange 14 and this flange is designed to rest against the outer face of the flange 8 of the section 4. The flange 14 of the section 11 has a notch 15 in which the lug 10 is received, which prevents the circumferential movement of the section 11 on the section 4. It is to be understood, of course, that the edge of the flange 8 rests on the top edge of the ring member 9, and likewise that the bolts 3 hold the rim section 4 from circumferential movement on the wheel.

Pivotally secured by rivets 16 to the flange 8 of the rim section 4 and to its thickened portion or ring 9 there are an equal number of levers 17 which are arcuate in plan. The rivets 16 have their ends headed, and the inner heads 18 are received in pockets 19 on one side of the rim or felly 2. The levers have beaded edges 20 for contacting engagement with the under faces of the bead or lip 12 on the auxiliary tire carrying rim section 11 when the levers are swung against the said section. The levers, adjacent to their outer ends have curved slots 21 entering from their beaded edges and struck from their pivots 16. These slots have inner widened and rounded terminals 22. The slots are designed to receive therethrough the projecting ends of the bolts 3, the said bolts having screwed on their said ends nuts 23 that have inner reduced and rounded extensions 24 that are received in the rounded passages of the key hole slots, whereby the levers are effectively locked in engagement with the rim section 11.

Passing through suitable openings between the respective pairs of pivots 16 and bolts 3 there are the short shanks of headed bolts 25, and the heads of these bolts are received in pockets 26 in the side of the felly 2. The levers 17 have additional key hole slots 27 struck from their pivots 16, and these slots are designed to receive therein the shanks of short bolts 25. The bolts 25 have screwed thereon nuts 28 provided on their inner faces with reduced rounded extensions 29, and these extensions are received in widened and rounded passages 30 of the key hole slots 27 in the levers. When the device is employed for supporting a spare tire thereon the same is, of course, removed from the wheel so that the bolts 3 do not engage therewith, and in this instance, the bolts 25 with their locking nuts 28 effectively hold the levers in locking engagement with the rim sections 11.

The construction and operation of our improvement will, it is thought, be apparent to those skilled in the art to which the invention relates. By merely releasing the nuts 28 and 23 the levers will be swung to the position illustrated in Figure 5 of the drawings which permits of the section 11 being removed from the section 4 of the rim and which allows a tire to be arranged on or drawn off of the rim. By swinging and again clamping the levers against the rim section 11, the tire is effectively supported on the rim. Of course, we do not wish to be restricted to the precise details of construction herein set forth and, therefore, hold ourselves entitled to such changes therefrom as fairly fall within the scope of what we claim.

Having described the invention, we claim:—

1. A tire carrying rim comprising a main section that has its inner edge formed with a depending flange, a plurality of equidistantly spaced pivotally supported levers on the flange, an auxiliary rim section having a depending flange designed to rest on the outer edge of the first mentioned flange, co-engaging means between the flanges for preventing independent circumferential movement thereof, said levers designed to be swung against the auxiliary rim section for holding both sections associated and removable locking means for the levers.

2. The combination with the felly, of a vehicle wheel, of a tire carrying rim comprising a main section having a flange on its inner edge which contacts with one of the sides of the felly, bolt members passing through the felly and through the said flange of the rim section, said flange having a ring enlargement on its outer face, formed with an outstanding lug, a removable rim section having a flange to contact with the flange of the fixed section and to rest on the rim and said last mentioned flange having a notch to receive the lug of the rim therein, levers pivotally supported on the flange of the main rim section, and the heads of the pivots being pocketed in the felly, each of said levers having a key hole slot struck from its pivot to receive the mentioned bolts therein when the levers are swung against the removable rim section, and nuts screwed on the bolts and having inner rounded extensions which are received in the widened passages of the key hole slots.

3. The combination with the felly of a vehicle wheel, of a tire carrying rim arranged therearound and comprising a main section having an inner depending flange that contacts with one side of the felly and its opposite edge formed with an inwardly rounded lip, said flange having a flat ring member on the outer face thereof and said ring member having a projecting lug, equidistantly spaced ports passing through the felly and the flange and rim, a removable tire rim section having an outer lip and an inner flange, which latter is notched, and designed to be received against the flange of the first mentioned section, to rest on the rim and to receive the lug in the notch thereof, equidistantly spaced levers which are arcuate in plan pivoted to the rim and flange of the main rim section, and the inner heads of the pivots being pocketed in the felly, each of said levers having key hole slots designed to receive therethrough the mentioned bolts when the levers are swung against the flange of the auxiliary tire sections, nuts having inner rounded extensions screwed on the bolts and received in the widened passage of the key hole slots of the levers, said levers having beaded edges to contact with the lip of the auxiliary tire section, said levers having other key hole slots entering from their lipped edge, short bolts passing through the flange of the main rim section and the ring thereon, and having their heads pocketed in the side of the felly and designed to be received through the last mentioned slots of the levers and nuts threaded on said bolts having inner rounded extensions which are received in the widened passages of the slots.

In testimony whereof we affix our signatures.

CHARLES JOSEPH RABIDOUX.
WILLIAM M. EINHORN.